United States Patent
Hwang

(10) Patent No.: US 10,412,810 B2
(45) Date of Patent: Sep. 10, 2019

(54) SETTING SUPPORT APPARATUS, IMAGE PROCESSING SYSTEM, AND NON-TRANSITORY COMPUTER-READABLE RECORDING MEDIUM

(71) Applicant: OMRON Corporation, Kyoto (JP)

(72) Inventor: Jaewook Hwang, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/891,373

(22) Filed: Feb. 8, 2018

(65) Prior Publication Data
US 2019/0053352 A1 Feb. 14, 2019

(30) Foreign Application Priority Data
Aug. 10, 2017 (JP) .................. 2017-155538

(51) Int. Cl.
| | |
|---|---|
| H05B 37/02 | (2006.01) |
| G06F 3/0484 | (2013.01) |
| G03B 15/02 | (2006.01) |
| H05B 33/08 | (2006.01) |

(52) U.S. Cl.
CPC ............ H05B 37/02 (2013.01); G03B 15/02 (2013.01); G06F 3/0484 (2013.01); H05B 33/0863 (2013.01)

(58) Field of Classification Search
CPC ............ H05B 37/0218; H05B 37/0245; H05B 37/0254; H05B 37/0281; H05B 37/0272; H05B 37/0227
See application file for complete search history.

(56) References Cited

U.S. PATENT DOCUMENTS

| | | | |
|---|---|---|---|
| 2011/0301441 A1* | 12/2011 | Bandic ................. | A61B 5/0059 600/306 |
| 2012/0082364 A1* | 4/2012 | Tani .................... | G06T 7/90 382/133 |
| 2013/0155723 A1* | 6/2013 | Coleman ............. | G02B 6/0018 362/621 |
| 2013/0201316 A1* | 8/2013 | Binder .................. | H04L 67/12 348/77 |
| 2014/0268815 A1* | 9/2014 | Li et al. ............... | G02B 6/001 362/311.02 |
| 2015/0029326 A1* | 1/2015 | Backman ............. | G02B 21/365 348/80 |
| 2015/0051498 A1* | 2/2015 | Darty ................... | A61B 5/447 600/477 |

(Continued)

FOREIGN PATENT DOCUMENTS

| | | |
|---|---|---|
| JP | 2009-128345 | 6/2009 |
| JP | 2015-232487 | 12/2015 |

Primary Examiner — Douglas W Owens
Assistant Examiner — Syed M Kaiser
(74) Attorney, Agent, or Firm — JCIPRNET

(57) ABSTRACT

Provided are a setting support apparatus capable of reducing a workload in lighting setting for an illumination device, an image processing system, and a setting support program. A user interface for performing lighting setting with respect to an illumination device includes a lighting region receiving region that receives setting of a region to be turned on, and a light emitting intensity receiving region that receives setting of light emitting intensity for each light source. In addition, the user interface includes a setting content displaying region that graphically displays a setting content.

19 Claims, 14 Drawing Sheets

(56) References Cited

U.S. PATENT DOCUMENTS

| | | | |
|---|---|---|---|
| 2016/0047890 A1* | 2/2016 | Ryan | G01S 5/16 |
| | | | 398/118 |
| 2016/0182864 A1* | 6/2016 | Izawa | H04N 5/44 |
| | | | 348/159 |
| 2017/0205572 A1* | 7/2017 | Nichol | G02B 6/0028 |
| 2017/0224260 A1* | 8/2017 | Darty | A61B 5/14552 |
| 2017/0292908 A1* | 10/2017 | Wilk | G01J 3/0259 |
| 2018/0131880 A1* | 5/2018 | Hicks | G06K 9/00228 |

* cited by examiner

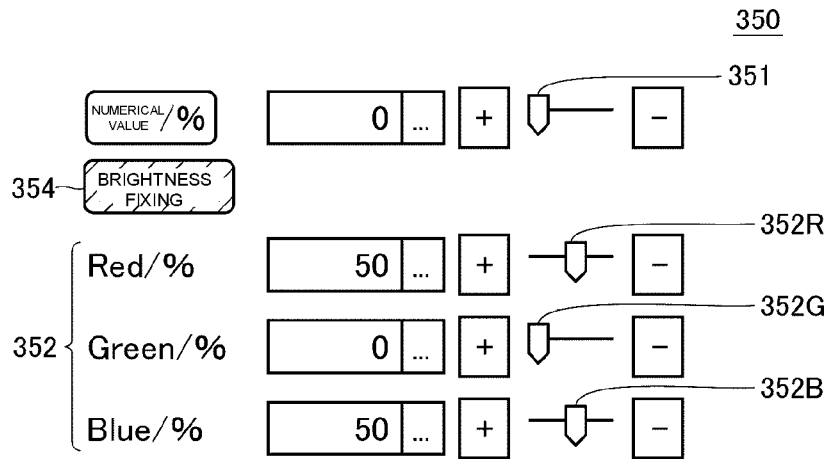
FIG. 14
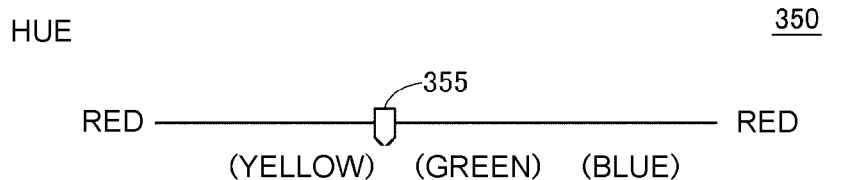
FIG. 15
350
⦿ WHITE      ○ RED  — 357
○ GREEN      ○ BLUE
○ CYAN      ○ MAGENTA
○ YELLOW      ○ OFF
FIG. 16

SETTING SUPPORT APPARATUS, IMAGE PROCESSING SYSTEM, AND NON-TRANSITORY COMPUTER-READABLE RECORDING MEDIUM

CROSS-REFERENCE TO RELATED APPLICATION

This application claims the priority of Japan patent application serial no. 2017-155538, filed on Aug. 10, 2017. The entirety of the above-mentioned patent application is hereby incorporated by reference herein and made a part of this specification.

BACKGROUND

Technical Field

The disclosure relates to a setting support apparatus for performing lighting setting for an illumination device, an image processing system, and a setting support program.

Related Art

In the field of factory automation (FA), an image processing technology, in which an image of a target (hereinafter also referred to as a "workpiece") is captured under illumination of light from an illumination device and information related to the workpiece is acquired from generated image data, has been utilized.

As the illumination devices utilized in the field of image processing technologies, various illumination devices have been developed. For example, Japanese Laid-open No. 2009-128345 discloses an illumination device which includes multiple illumination units having colored rays of light different from each other. In addition, Japanese Laid-open No. 2015-232487 discloses an illumination device which includes multiple illuminations having illumination directions different from each other.

In illumination devices having various conditions that can be set, such as a color of illumination and a direction of illumination, include many illumination patterns, thereby resulting in an increase of a workload of a user in lighting setting performed to select an optimal illumination pattern.

SUMMARY

According to an aspect of the disclosure, there is provided a setting support apparatus performing lighting setting with respect to an illumination device which includes multiple sets of multiple types of light emitting units having dominant wavelengths different from each other. The setting support apparatus includes a user interface means for receiving a user operation and performing the lighting setting in accordance with the user operation, and an output means for outputting the lighting setting performed via the user interface means to the illumination device. The user interface means includes a means for displaying multiple regions set with respect to a lighting region of each set of the multiple light emitting units, a means for receiving selection of one or multiple regions from the multiple regions, a means for receiving designation of light emitting intensity for each type of the light emitting units, and a means for setting the designated light emitting intensity for each type with respect to the light emitting units included in the selected one or multiple regions.

According to another aspect of the disclosure, there is provided an image processing system. The image processing system includes an image capturing unit that captures an image of a target, an illumination unit that includes multiple sets of multiple types of light emitting units having dominant wavelengths different from each other, a user interface means for receiving a user operation and performing lighting setting with respect to the illumination unit in accordance with the user operation, and an output means for outputting the lighting setting performed via the user interface means to the illumination unit. The user interface means includes a means for displaying multiple regions set with respect to a lighting region of each set of the multiple light emitting units, a means for receiving selection of one or multiple regions from the multiple regions, a means for receiving designation of light emitting intensity for each type of the light emitting units, and a means for setting the designated light emitting intensity for each type with respect to the light emitting units included in the selected one or multiple regions.

According to further another aspect of the disclosure, there is provided a non-transitory computer-readable recording medium recording a setting support program for performing lighting setting with respect to an illumination device which includes multiple sets of multiple types of light emitting units having dominant wavelengths different from each other. The setting support program includes a step of receiving selection of one or multiple regions from multiple regions set with respect to a lighting region of each set of the multiple light emitting units, a step of receiving designation of light emitting intensity for each type of the light emitting units, a step of setting the designated light emitting intensity for each type with respect to the light emitting units included in the selected one or multiple regions, and a step of outputting lighting setting including the set light emitting intensity to the illumination device.

BRIEF DESCRIPTION OF THE DRAWINGS

FIG. 14 is a view illustrating a modification example of a light emitting intensity receiving region.

FIG. 15 is a view illustrating the modification example of the light emitting intensity receiving region.

FIG. 16 is a view illustrating the modification example of the light emitting intensity receiving region.

DESCRIPTION OF THE EMBODIMENTS

Figure 1:
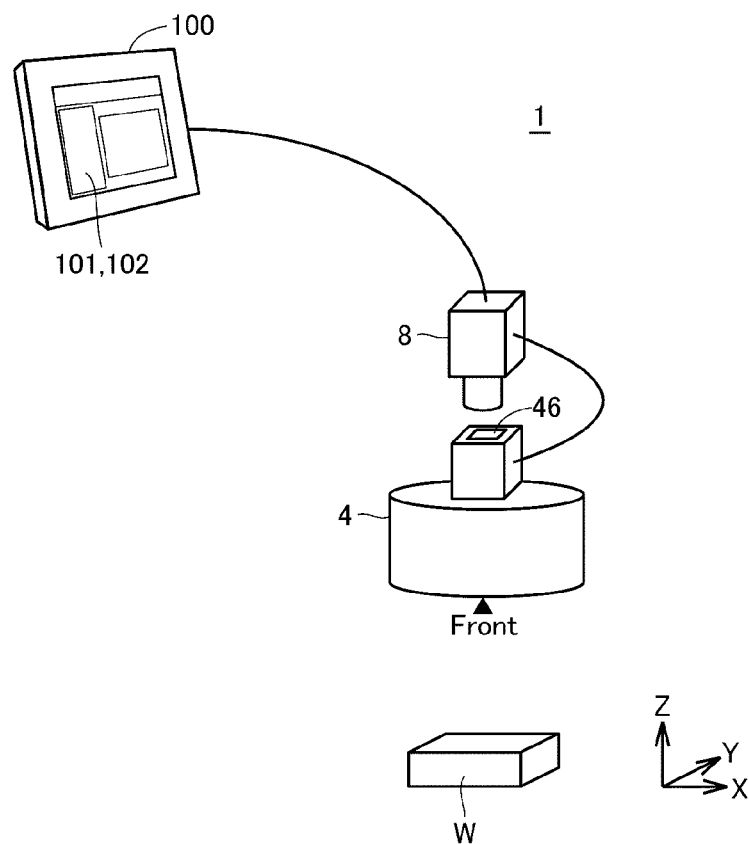
FIG. 1 is a schematic view illustrating a basic configuration of an image processing system according to an embodiment of the disclosure.

The disclosure provides a setting support apparatus capable of reducing a workload in lighting setting for an illumination device, an image processing system, and a setting support program.

According to an aspect of the disclosure, there is provided a setting support apparatus performing lighting setting with respect to an illumination device which includes multiple sets of multiple types of light emitting units having dominant wavelengths different from each other. The setting support apparatus includes a user interface means for receiving a user operation and performing the lighting setting in accordance with the user operation, and an output means for outputting the lighting setting performed via the user interface means to the illumination device. The user interface means includes a means for displaying multiple regions set with respect to a lighting region of each set of the multiple light emitting units, a means for receiving selection of one or multiple regions from the multiple regions, a means for receiving designation of light emitting intensity for each type of the light emitting units, and a means for setting the designated light emitting intensity for each type with respect to the light emitting units included in the selected one or multiple regions.

In one or more embodiments, the means for displaying multiple regions displays the selected one or multiple regions in a form different from the forms of other regions.

In one or more embodiments, the means for displaying multiple regions displays the selected one or multiple regions in a color regulated based on the designated light emitting intensity for each type.

In one or more embodiments, the multiple regions include one or multiple annular regions, each of the one or multiple annular regions include multiple arc-shaped regions, and the means for receiving selection of one or multiple regions includes a means for receiving selection of one or multiple arc-shaped regions from the multiple arc-shaped regions.

In one or more embodiments, the multiple regions include the multiple annular regions having diameters different from each other, and the means for receiving selection of one or multiple regions further includes a means for receiving selection of one or multiple annular regions from the multiple annular regions having diameters different from each other.

In one or more embodiments, the means for receiving designation of light emitting intensity for each type of the light emitting units includes a means for receiving designation of light emitting intensity for all of the light emitting units in a state in which relative light emitting intensity for each type of the light emitting units with respect to the light emitting intensity for all of the light emitting units included in the selected one or multiple regions is uniformly maintained.

In one or more embodiments, the means for receiving designation of light emitting intensity for each type of the light emitting units includes a means for receiving designation of relative light emitting intensity for each type of the light emitting units with respect to the light emitting intensity for all of the light emitting units in a state in which light emitting intensity for all of the light emitting units included in the selected one or multiple regions is uniformly maintained.

In one or more embodiments, the setting support apparatus further includes an acquisition means for acquiring image data which is generated from an image of an irradiation region of the illumination device captured by an image capturing device. In one or more embodiments, the user interface means further includes a means for displaying the image data acquired by the acquisition means.

In one or more embodiments, the setting support apparatus further includes a storage means for storing the lighting setting set via the user interface means. In one or more embodiments, the user interface means further includes a means for outputting information related to the lighting setting stored by the storage means and receiving a change in the output lighting setting.

In one or more embodiments, the storage means correspondingly stores the set lighting setting and the image data generated from an image captured when the illumination device irradiates the irradiation region under the set lighting setting, and the user interface means further includes a means for displaying the output lighting setting and the image data corresponding to the lighting setting and displaying lighting setting of which a change is received and image data generated from an image captured when the illumination device irradiates the irradiation region under the lighting setting.

According to another aspect of the disclosure, there is provided an image processing system. The image processing system includes an image capturing unit that captures an image of a target, an illumination unit that includes multiple sets of multiple types of light emitting units having dominant wavelengths different from each other, a user interface means for receiving a user operation and performing lighting setting with respect to the illumination unit in accordance with the user operation, and an output means for outputting the lighting setting performed via the user interface means to the illumination unit. The user interface means includes a means for displaying multiple regions set with respect to a lighting region of each set of the multiple light emitting units, a means for receiving selection of one or multiple regions from the multiple regions, a means for receiving designation of light emitting intensity for each type of the light emitting units, and a means for setting the designated light emitting intensity for each type with respect to the light emitting units included in the selected one or multiple regions.

According to further another aspect of the disclosure, there is provided a non-transitory computer-readable recording medium recording a setting support program for performing lighting setting with respect to an illumination device which includes multiple sets of multiple types of light emitting units having dominant wavelengths different from each other. The setting support program includes a step of receiving selection of one or multiple regions from multiple regions set with respect to a lighting region of each set of the multiple light emitting units, a step of receiving designation of light emitting intensity for each type of the light emitting units, a step of setting the designated light emitting intensity for each type with respect to the light emitting units included in the selected one or multiple regions, and a step of outputting lighting setting including the set light emitting intensity to the illumination device.

It is possible to reduce a workload in lighting setting for an illumination device by using the setting support apparatus according to the aspect of the disclosure.

The foregoing and other aspects of the disclosure will become apparent from the following detailed description and from the accompanying drawings.

Hereinafter, an embodiment according to the disclosure will be described with reference to the drawings. In the description below, the same reference signs are applied to the same components and constituent elements. The same applies to the names and the functions thereof. Therefore, detailed description thereof will not be repeated. The embodiment and each of the modification examples described below may be suitably and selectively combined.

[A. Configuration of Image Processing System]

FIG. 1 is a schematic view illustrating a basic configuration of an image processing system 1 according to the embodiment of the disclosure. As main constituent elements, the image processing system 1 includes an image processing apparatus 100, a camera 8, and an illumination device 4. The image processing apparatus 100 and the camera 8 are connected to each other such that data communication therebetween can be performed. The illumination device 4 is controlled by the image processing apparatus 100 via the camera 8.

The illumination device 4 is disposed such that at least a part of an inspection target (hereinafter also referred to as a "workpiece W") is positioned in an irradiation region of the illumination device 4. When the workpiece W is transported by a transportation apparatus such as a conveyor belt, the illumination device 4 is disposed such that at least a part of the transportation apparatus is positioned in the irradiation region.

Hereinafter, for convenience of description, an irradiation direction of light from the illumination device 4 is defined as a Z-axis. A traverse direction in the drawing is an X-axis, and an axis perpendicular to the X-axis and the Z-axis is a Y-axis. In addition, a side irradiated with light is the bottom. In addition, the right side when facing the illumination device from the position indicated as "Front" in FIG. 1 is the right, the left side is the left, the viewer's side is the front, and the far side is the rear.

An opening portion 46 is provided in an upper portion of the illumination device 4 such that the camera 8 can capture an image of the workpiece W through the upper portion of the illumination device 4. In the present embodiment, the camera 8 is installed above the illumination device 4. However, the camera 8 need only be installed such that at least a part of its image capturing visual field includes at least a part of the irradiation region of the illumination device 4. The camera 8 may be installed beside the illumination device 4.

The camera 8 is an image capturing unit which captures an image of a subject present in the image capturing visual field and generates image data. As main constituent elements, the camera 8 includes an optical system having a lens, a diaphragm and the like, and light receiving elements such as a charge coupled device (CCD) image sensor and a complementary metal oxide semiconductor (CMOS) image sensor.

The image processing apparatus 100 can receive setting of a content of image processing, in addition to executing image processing such as inspecting the presence or absence of a defect or a stain on the workpiece W, measuring the size, disposition, the direction, and the like of the workpiece W, and recognizing letters or figures on a surface of the workpiece W. Setting of a content of image processing includes setting of image capturing conditions at the time of acquiring image data, and setting of a processing content executed with respect to image data. Setting of image capturing conditions includes lighting setting with respect to the illumination device 4, and camera setting with respect to the camera 8. The image processing apparatus 100 functions as a setting support apparatus which performs lighting setting with respect to the illumination device 4. A setting support apparatus performing lighting setting with respect to the illumination device 4 may be provided separately from the image processing apparatus 100.

The image processing apparatus 100 includes a display unit 101 and a touch panel 102 which is mounted on a display surface of the display unit 101. Typically, the display unit 101 is constituted of a liquid crystal display and displays a setting content for a user, for example. The touch panel 102 functions as an input unit for inputting information related to various types of setting. For example, a user can input setting information related to setting of a content of image processing by operating based on information displayed in the display unit 101. Here, the input unit is constituted of a touch panel. However, the input unit may be constituted of a keyboard, a mouse, or both thereof.

[B. Configuration of Illumination Device]

Figure 2:
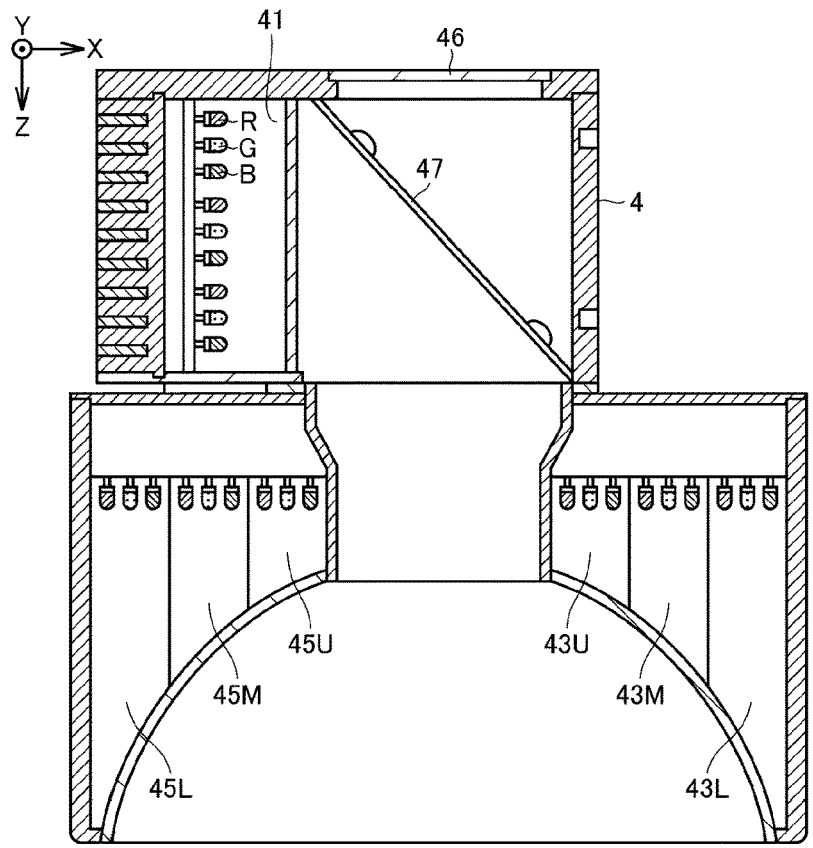
FIG. 2 is a cross-sectional view of an illumination device.
Figure 3:
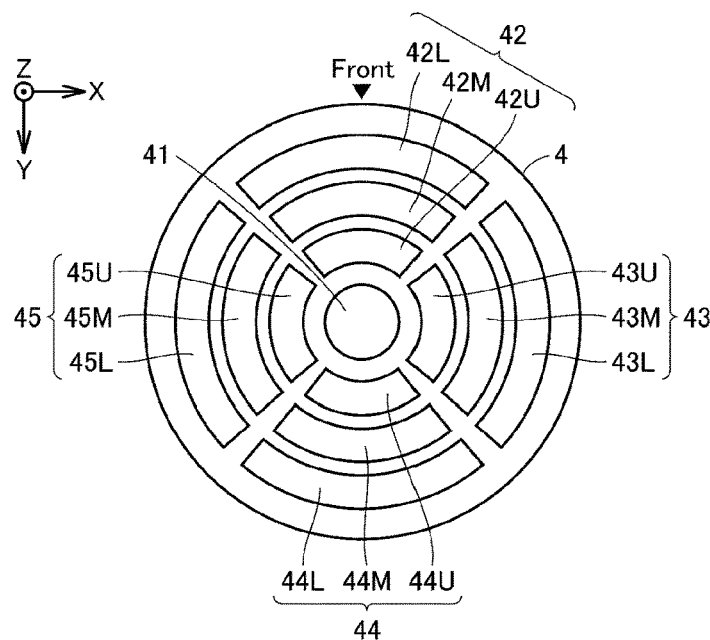
FIG. 3 is a bottom view of the illumination device.

A configuration of the illumination device 4 will be described with reference to FIGS. 2 and 3. FIG. 2 is a view illustrating an XZ-cross section of the illumination device 4. FIG. 3 is a bottom view of the illumination device 4.

In FIG. 2, the XZ-cross section of the illumination device 4 is seen from the position indicated as "Front" in FIG. 1. As illustrated in FIG. 2, an illumination of the illumination device 4 has a dome shape. In the illumination device 4, multiple sets of multiple types of light emitting units (hereinafter also referred to as "light sources") having dominant wavelengths different from each other are provided at positions facing the workpiece W. Specifically, multiple sets of light sources are provided and one set thereof is configured to include a red light source R, a green light source G, and a blue light source B. In FIG. 2, the light sources to which lines are applied obliquely downward to the left are the red light sources R. The light sources to which a dot pattern is applied are the green light sources G. The light sources to which lines are applied obliquely downward to the right are the blue light sources B. The reference signs are partially omitted.

The multiple light sources are allocated to multiple regions. Specifically, including a circular central region 41 (hereinafter also referred to as a "circular region") in the center, front regions 42, right regions 43, rear regions 44, and left regions 45 having arc shapes provided in the outer circumference of the central region 41 are set with respect to the lighting region of each set of the multiple light sources provided in the illumination device 4.

In the central region 41, the front regions 42, the right regions 43, the rear regions 44, and the left regions 45, irradiation light from each of the regions differs in incident azimuth. The incident azimuth is an azimuth having the Z-axis as the center. In addition, the front regions 42, the right regions 43, the rear regions 44, and the left regions 45 form an annular shape in their entirety having the central region 41 as the center. In the present embodiment, an annular region is divided into four regions having the central region 41 as the center. However, the divided regions may be more than four or may be three or less. Irradiation light from the central region 41 reaches a reflective plate 47 and is reflected downward.

In addition, multiple annular regions (hereinafter also referred to as "annular regions") having the central region 41 as the center and having diameters different from each other are set with respect to the lighting region of each set of the multiple light sources. Specifically, an upper region, a middle region, and a lower region are set. Each of the upper region, the middle region, and the lower region includes multiple arc-shaped regions. For example, the upper region includes a front region upper portion 42U, a right region upper portion 43U, a rear region upper portion 44U, and a left region upper portion 45U. Similarly, the middle region includes a front region middle portion 42M, a right region middle portion 43M, a rear region middle portion 44M, and a left region middle portion 45M. The lower region includes a front region lower portion 42L, a right region lower portion 43L, a rear region lower portion 44L, and a left region lower portion 45L. Irradiation light from each of the annular regions having diameters different from each other differs in incident angle of light incident on an XY-plane. Three annular regions are set. However, annular regions may be more than three or may be two.

According to the present embodiment, the multiple light sources provided in the illumination device 4 are divided into 13 regions. In the illumination device 4, the light emitting state of the light source can be adjusted for each of the 13 regions provided in the illumination device 4. Here, the light emitting state of the light source includes not only lighting and lights-out but also the color and intensity of irradiation light from the region.

The numbers of red light sources R, green light sources G, and blue light sources B disposed in each region are not necessarily the same as each other. The light sources of three types need only be disposed one or more for each type. In addition, the ratio of the red light sources R, the green light sources G, and the blue light sources B included in each region may be equal to each other or may be not equal to each other. For example, more red light sources R than other light sources may be disposed in one region, and less red light sources R than other light sources may be disposed in a different region.

For example, the illumination device 4 can turn on only the light source included in the front region lower portion 42L and can turn off all of the light sources included in the remaining regions. In this manner, in the illumination device 4, the light emitting state of the light source can be adjusted for each region. Therefore, the workpiece W can be irradiated with light from above, from the front, from the right, from the rear, or from the left. That is, the illumination device 4 can perform irradiation of light from various incident azimuths. In addition, since the illumination device 4 is divided into multiple annular regions having diameters different from each other, it is possible to perform irradiation of light at various incident angles. In addition, in the illumination device 4, when light sources in a region are turned on, lighting can be performed while light emitting intensity is changed for each light source differing in dominant wavelength. Therefore, the illumination device 4 can change the color of irradiation light with respect to the workpiece W.

[C. Hardware Configuration of Image Processing Apparatus 100]

Figure 4:
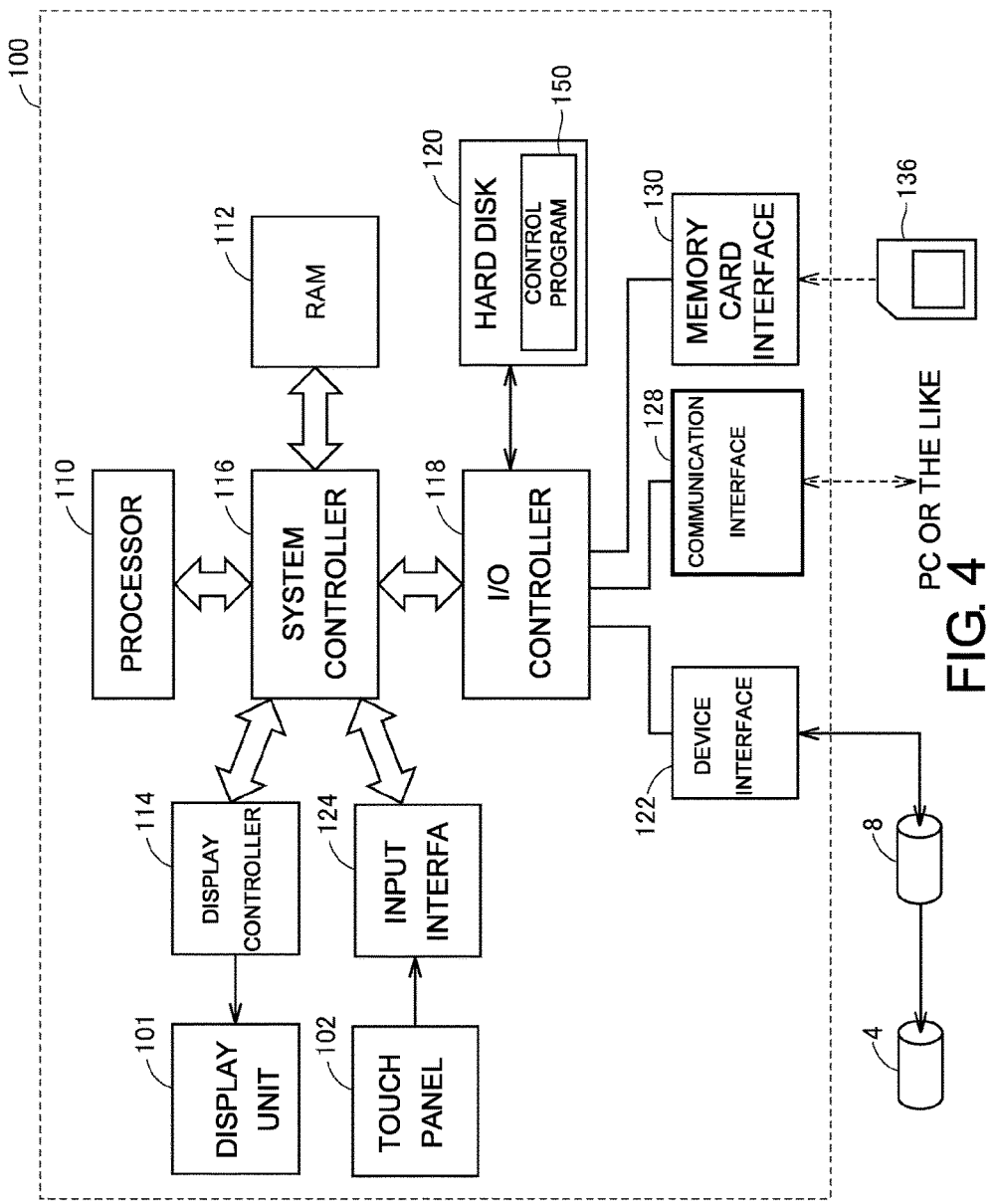
FIG. 4 is a schematic view illustrating a hardware configuration of an image processing apparatus.

FIG. 4 is a schematic view illustrating a hardware configuration of the image processing apparatus 100. As illustrated in FIG. 4, typically, the image processing apparatus 100 has a structure which suits general-purpose computer architecture. When a processor executes a program installed in advance, various types of processing are realized as described below.

More specifically, the image processing apparatus 100 includes a processor 110 such as a central processing unit (CPU) or a micro-processing unit (MPU), a random access memory (RAM) 112, a display controller 114, a system controller 116, an input/output (I/O) controller 118, a hard disk 120, a device interface 122, an input interface 124, a communication interface 128, and a memory card interface 130. These units are connected to each other such that data communication therebetween can be performed through the system controller 116 serving as the center.

The processor 110 exchanges programs (codes) and the like with the system controller 116 and executes those in a predetermined order, thereby realizing aimed computation processing.

The system controller 116 is connected to each of the processor 110, the RAM 112, the display controller 114, the input interface 124, and the I/O controller 118 via a bus. The system controller 116 performs data exchange and the like between the units and controls processing of the image processing apparatus 100 in its entirety.

Typically, the RAM 112 is a volatile storage device such as a dynamic random access memory (D-RAM). The RAM 112 holds a program read out from the hard disk 120, a camera image (image data) acquired by the camera 8, a processing result with respect to the image data, workpiece data including the image capturing conditions, and the like.

The display controller 114 is connected to the display unit 101 and outputs a signal for displaying various types of information to the display unit 101 in response to an internal command from the system controller 116.

The input interface 124 is connected to the touch panel 102 and transmits various types of information input from the touch panel 102 to the system controller 116.

The I/O controller 118 controls data exchange with a recording medium or an external instrument connected to the image processing apparatus 100. More specifically, the I/O controller 118 is connected to the hard disk 120, the device interface 122, the communication interface 128, and the memory card interface 130.

Typically, the hard disk 120 is a non-volatile magnetic storage device. In addition to a control program 150 such as an algorithm executed by the processor 110, various setting values are stored therein. The control program 150 installed in the hard disk 120 is distributed in a state of being stored in a memory card 136 or the like. In place of the hard disk 120, a semiconductor storage device such as a flash memory, or an optical storage device such as a digital versatile disk random access memory (DVD-RAM) may be employed.

The device interface 122 mediates data transmission of the processor 110 with respect to the camera 8 and the illumination device 4. The device interface 122 outputs an instruction to the camera 8 and the illumination device 4 via the device interface 122 in accordance with the image capturing conditions commanded from the processor 110. In addition, the device interface 122 acquires image data obtained by capturing an image of the workpiece W and mediates data transmission between the processor 110 and the camera 8.

The communication interface 128 mediates data transmission between the processor 110 and a different personal computer, server apparatus, or the like (not illustrated). Typically, the communication interface 128 is constituted of the Ethernet (registered trademark), a universal serial bus (USB), or the like.

The memory card interface 130 mediates data transmission between the processor 110 and the memory card 136 serving as a recording medium. The control program 150 or the like executed by the image processing apparatus 100 is distributed in a state of being stored in the memory card 136. The memory card interface 130 reads out the control program from the memory card 136. The memory card 136 is constituted of a general-purpose semiconductor storage device such as a secure digital (SD), a magnetic recording medium such as a flexible disk, an optical recording medium such as a compact disk read only memory (CD-ROM), or the like. Alternatively, a program which has been downloaded from a delivery server or the like via the communication interface 128 may be installed in the image processing apparatus 100.

When utilizing a computer having a structure which suits general-purpose computer architecture as described above, in addition to the application for providing the functions according to the present embodiment, an operating system (OS) for providing basic functions of computers may be installed. In this case, the control program according to the present embodiment may invoke a necessary module from program modules provided as a part of the OS in a predetermined order and/or at predetermined timing and may execute processing.

Moreover, the control program according to the present embodiment may be provided by being incorporated into a part of a different programs. In such a case as well, the program itself does not include a module to be included in the different program which can be combined as described above, and processing is executed in cooperation with the different program. That is, the control program according to the present embodiment may be in a form of being incorporated into such a different program.

Alternatively, a part or the entirety of the function provided through execution of the control program may be mounted in a dedicated hardware circuit.

[D. User Interface for Performing Lighting Setting with Respect to Illumination Device]

Figure 5:
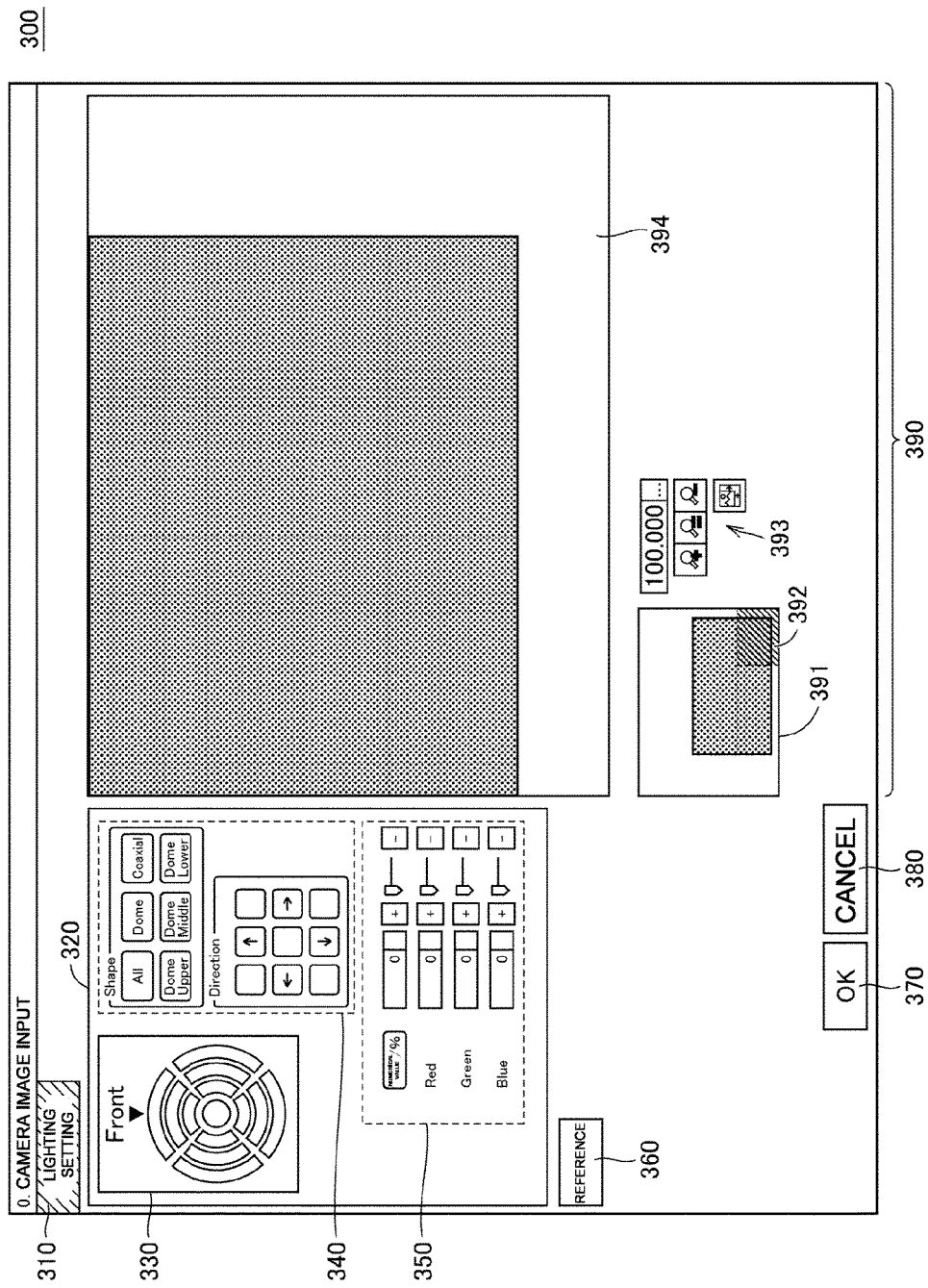
FIG. 5 is a view illustrating a user interface for performing lighting setting with respect to the illumination device.

Next, a user interface 300 for performing lighting setting with respect to the illumination device 4 provided by the image processing apparatus 100 according to the present embodiment will be described. FIG. 5 is a view illustrating the user interface 300 for performing lighting setting with respect to the illumination device 4. As illustrated in FIG. 5, when a lighting setting tab 310 is selected, the display unit 101 displays the user interface 300 for performing lighting setting with respect to the illumination device 4. In FIG. 5, tabs other than the lighting setting tab 310 are omitted. However, tabs related to different setting, such as a "camera setting" tab for performing setting with respect to the camera 8, and an "image processing setting" tab for setting processing content to be executed with respect to the acquired image data may be additionally provided.

In processes of setting with respect to the illumination device 4, the "lighting setting" indicates selecting an illumination pattern of the illumination device 4. Specifically, the lighting setting includes setting of a region to be turned on in the multiple regions, and setting of light emitting intensity of various light sources having dominant wavelengths different from each other. The color and the intensity of irradiation light from the illumination device are determined by setting the light emitting intensity of various light sources having dominant wavelengths different from each other.

The user interface 300 includes a receiving region 320, a reference button 360, an OK button 370, a cancel button 380, and a lighting state checking region 390.

The receiving region 320 includes a setting content displaying region 330 in which the setting content is graphically displayed, a lighting region receiving region 340 which receives setting of a region to be turned on, and a light emitting intensity receiving region 350 which receives setting of the light emitting intensity of each light source.

When a user operates various buttons included in the lighting region receiving region 340, selection of a region is received. In addition, when a user operates various icons included in the light emitting intensity receiving region 350, designation of light emitting intensity for each type in multiple types of the light sources having dominant wavelengths different from each other is received. When the lighting region receiving region 340 and the light emitting intensity receiving region 350 are operated, light emitting intensity for each type designated by operating the icons in the light emitting intensity receiving region 350 are set with respect to the light sources in the region selected by operating the buttons in the lighting region receiving region 340. When a user operates various buttons and various icons included in the lighting region receiving region 340 and the light emitting intensity receiving region 350 and selects a setting content, the setting content selected by the user is reflected in the setting content displaying region 330.

The reference button 360 is a button used for referring to the lighting setting stored in the RAM 112. When the reference button 360 is operated, the screen is switched to a screen for referring to the lighting setting.

When the OK button 370 is operated, information indicating the selected lighting setting is retained, and information indicating the lighting setting is stored in the RAM 112. When the cancel button 380 is operated, information indicating the selected lighting setting is discarded without being stored in the RAM 112.

After the OK button 370 is operated, various light sources may be set with respect to a region different from the set region. When the light emitting intensity of the light source is changed for each region, the lighting setting may be performed for each region to be set to the same light emitting intensity. For example, after first lighting setting for regulating the light emitting intensity with respect to a first region is performed, second lighting setting for regulating the light emitting intensity with respect to a second region may be performed.

The image data acquired from the camera 8 is displayed in the lighting state checking region 390. The image displayed in the lighting state checking region 390 is updated in real time. When a user performs the lighting setting by operating various buttons and various icons included in the receiving region 320, the processor 110 of the image processing apparatus 100 instructs the illumination device 4 to be turned on in accordance with the content of the performed lighting setting. That is, the processor 110 updates the lighting setting for the illumination device 4 in real time. As a result, the image data, when the illumination device is controlled under the lighting setting performed by a user operating various buttons and various icons included in the receiving region 320, is displayed in the lighting state checking region 390.

The lighting state checking region 390 includes a full display region 391, a display control icon group 393, and an image display region 394. The image data acquired from the camera 8 is displayed in the full display region 391 and the image display region 394. Full image data of a target is displayed in the full display region 391 independently from the display range in the image display region 394. The full display region 391 shows an image of a display range 392 displayed in the image display region 394. The display range 392 changes in accordance with a user operation (enlargement, reduction, or the like) with respect to the display control icon group 393. The display range and the display accuracy of the image data displayed in the image display region 394 change in response to a user operation with respect to the display control icon group 393.

[E. Receiving of Lighting Setting]

Figure 6:
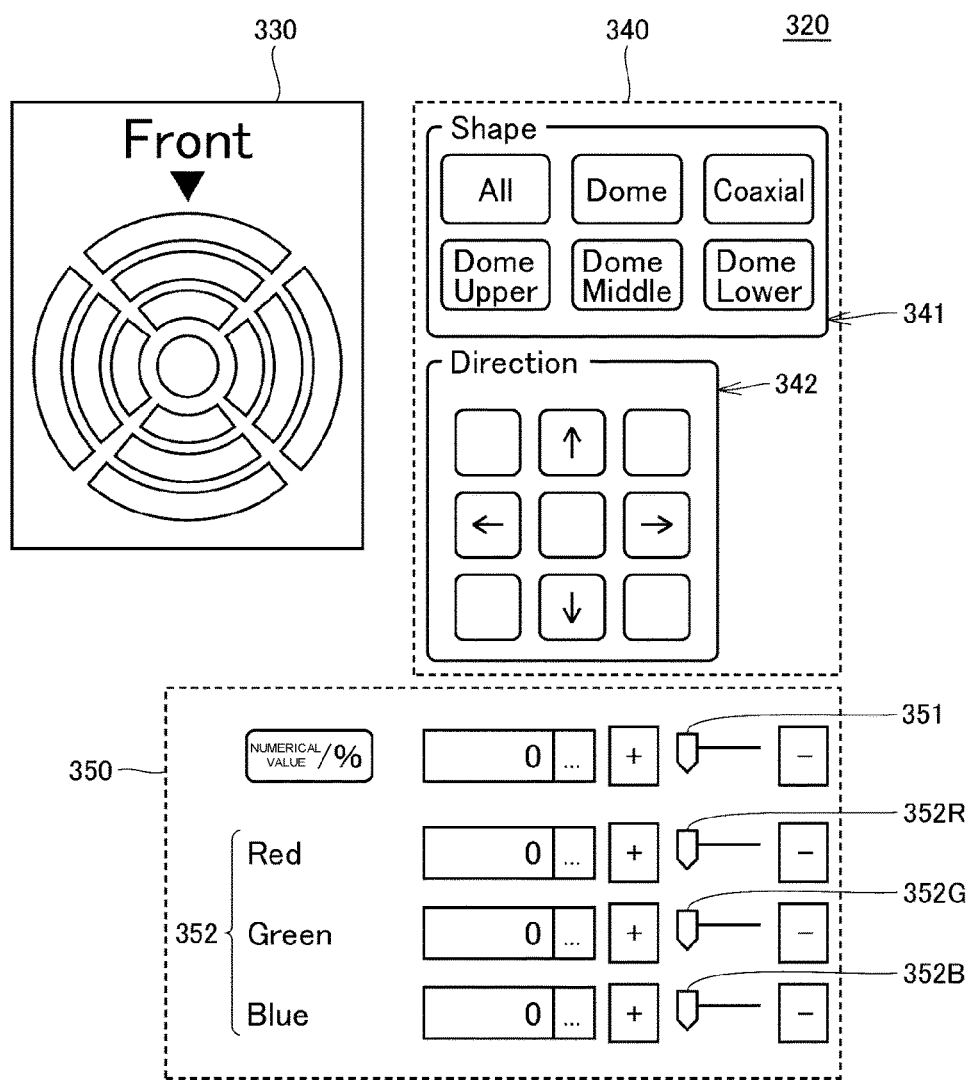
FIG. 6 is a view illustrating a receiving region in an initial stage of receiving setting.
Figure 7:
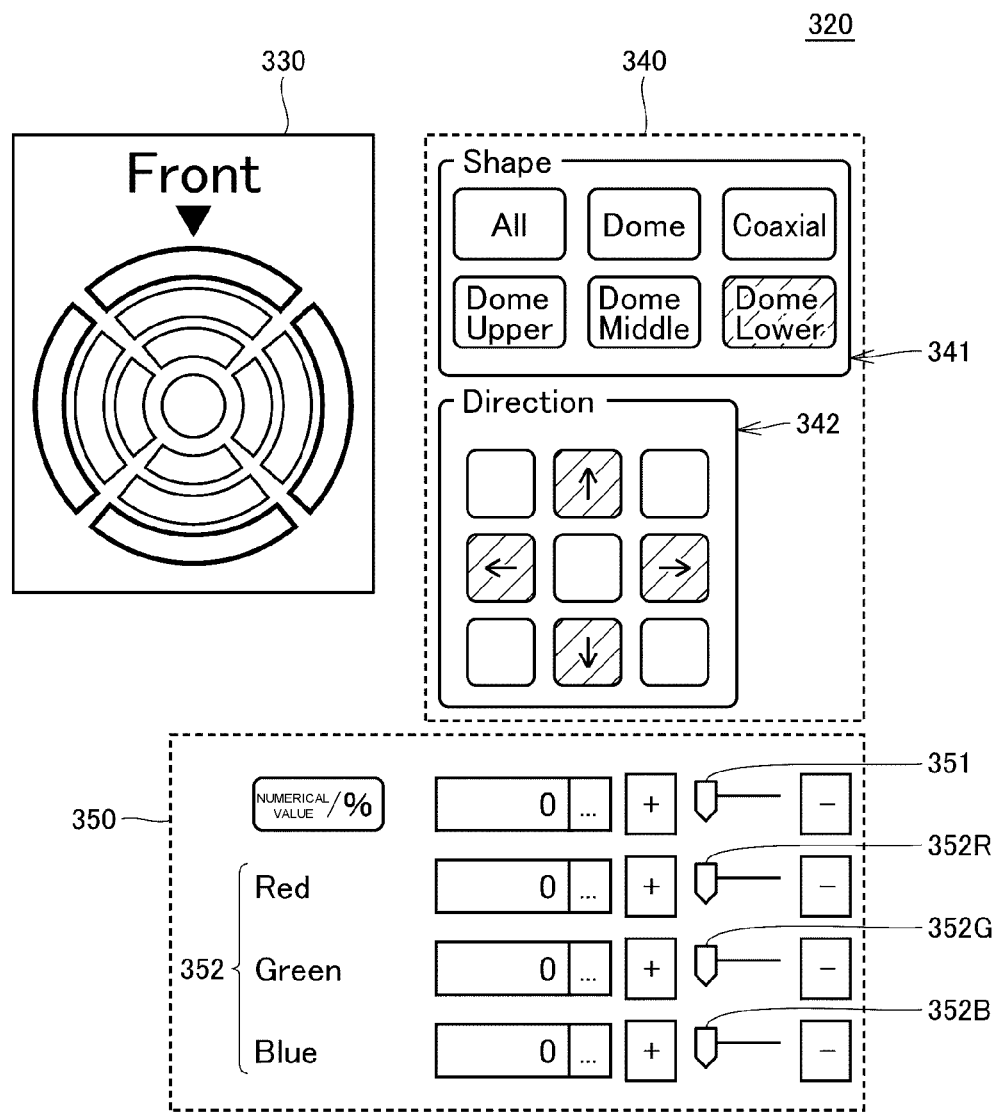
FIG. 7 is a view illustrating the receiving region in a stage in which a region is selected.
Figure 8:
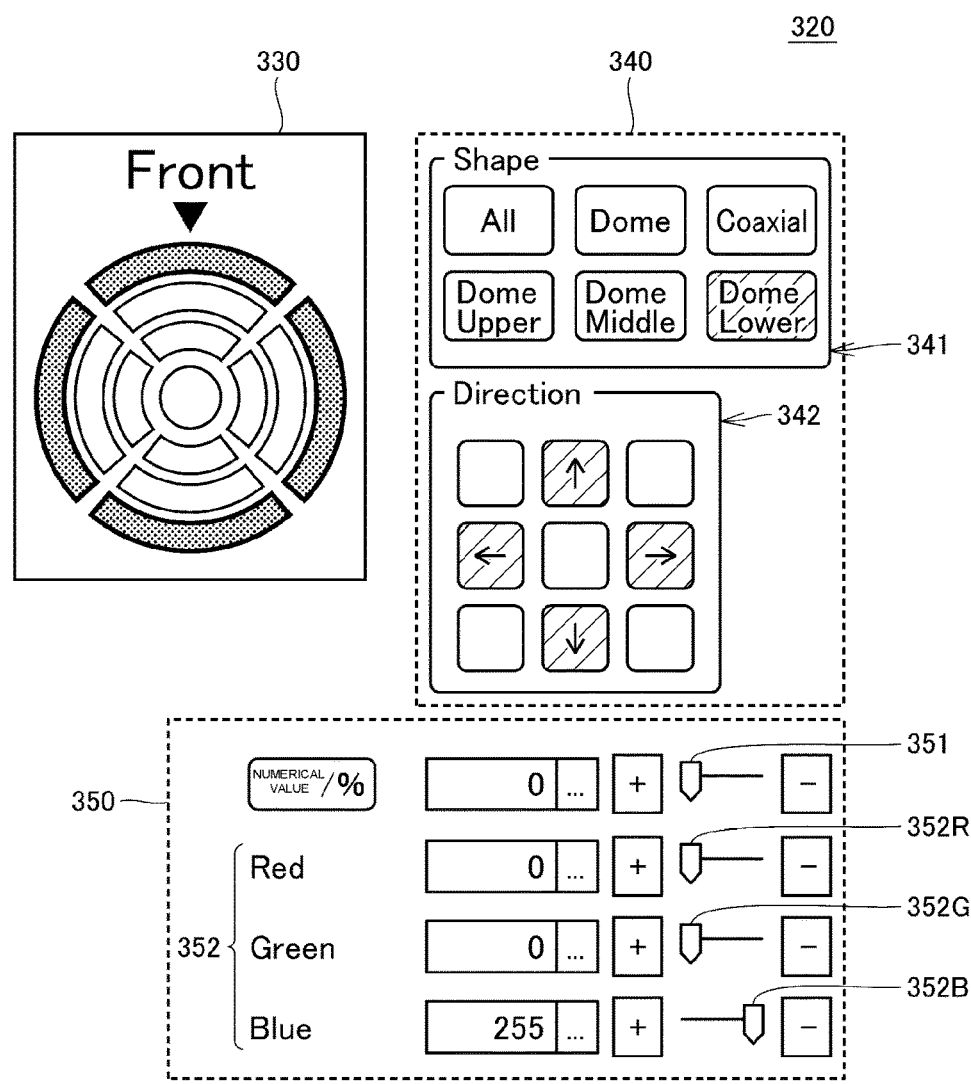
FIG. 8 is a view illustrating the receiving region in a stage in which light emitting intensity of the selected region is adjusted.

A user operation when lighting setting is performed and a display form of the receiving region 320 updated in response to a user operation will be described with reference to FIGS. 6 to 8. FIG. 6 is a view illustrating a receiving region in an initial stage of receiving setting. FIG. 7 is a view illustrating the receiving region in a stage in which a region is selected. FIG. 8 is a view illustrating the receiving region in a stage in which light emitting intensity of the selected region is adjusted.

The lighting region receiving region 340 includes a lighting shape receiving region 341 and a lighting direction receiving region 342.

The lighting shape receiving region 341 includes multiple buttons. When a user presses down these buttons, one or multiple annular regions can be selected from the multiple annular regions, and the range of the incident angle of light incident on the XY-plane can be adjusted. For example, when a "Dome" button is pressed down, an upper region group which is an annular region having the smallest diameter, a middle region group which is an annular region having an approximately medium-sized diameter, and a lower region group which is an annular region having the largest diameter are selected. In addition, when a "Coaxial" button is pressed down, the central region 41 is selected. In addition, when a "Dome Upper" button is pressed down, the upper region group which is an annular region having the smallest diameter is selected. Here, the region group denotes aggregation including the multiple regions.

The lighting direction receiving region 342 includes multiple buttons. When a user presses down these buttons, one or multiple arc-shaped regions can be selected from the multiple arc-shaped regions constituting the annular regions, and the incident azimuth of irradiation light from the illumination device 4 can be set. Here, the incident azimuth is an azimuth having the Z-axis as the center. For example, when an upward arrow button is pressed down, the region group included in the front regions 42 is selected. That is, when the upward arrow button is pressed down, the front region upper portion 42U, the front region middle portion 42M, and the front region lower portion 42L are selected.

The image processing apparatus 100 selects a region group in which the region group selected through an operation with respect to the lighting shape receiving region 341 and the region group selected through an operation with respect to the lighting direction receiving region 342 overlap each other, as the setting target. When an operation is performed with respect to only one region of the lighting shape receiving region 341 and the lighting direction receiving region 342, the region group selected through the operation with respect to the one region is selected as the setting target.

The light emitting intensity receiving region 350 includes a brightness adjustment bar 351 and a light emitting intensity adjustment bar 352 provided for each type of the light sources. A user can change the brightness of all of the light sources at the same ratio regardless of the type of the light source by operating the brightness adjustment bar 351. That is, the light emitting intensity of the light source can be changed without changing relative light emitting intensity for each type of the light sources with respect to the light emitting intensity for all of the light emitting units. Here, the relative light emitting intensity indicates the light emitting intensity of one type of the light source with respect to the light emitting intensity of all types of the light sources. For example, the relative light emitting intensity can be obtained by dividing the light emitting intensity of one type of the light source by the light emitting intensity of all types of the light sources. In addition, a user can adjust the brightness for each type of the light sources by operating the light emitting intensity adjustment bar 352. For example, the light emitting intensity of irradiation light from the red light sources R can be adjusted by operating a red light emitting intensity adjustment bar 352R.

When a button included in the lighting region receiving region 340 is pressed down and a region is selected, as illustrated in FIG. 7, the selected region is displayed in the setting content displaying region 330 in a form different from the forms of other regions. In regard to selected regions and regions which has not been selected, FIG. 7 illustrates an example in which the selected regions are recognizably displayed by displaying the selected regions to be indicated with bold lines. The selected region need only be able to be recognized by a user, and the display form is not limited to the form illustrated in FIG. 7.

After the region is selected, when the icons included in the light emitting intensity receiving region 350 are operated and the brightness is designated for various light sources, the selected region is displayed in the setting content displaying region 330 in a color regulated based on the designated light emitting intensity for each type. FIG. 8 illustrates an example in which a blue light emitting intensity adjustment bar 352B is maximized, and the red light emitting intensity adjustment bar 352R and a green light emitting intensity adjustment bar 352G are minimized. The selected region is displayed in blue in the setting content displaying region 330.

[F. User Interface for Referring to Stored Lighting Setting]

Figure 9:
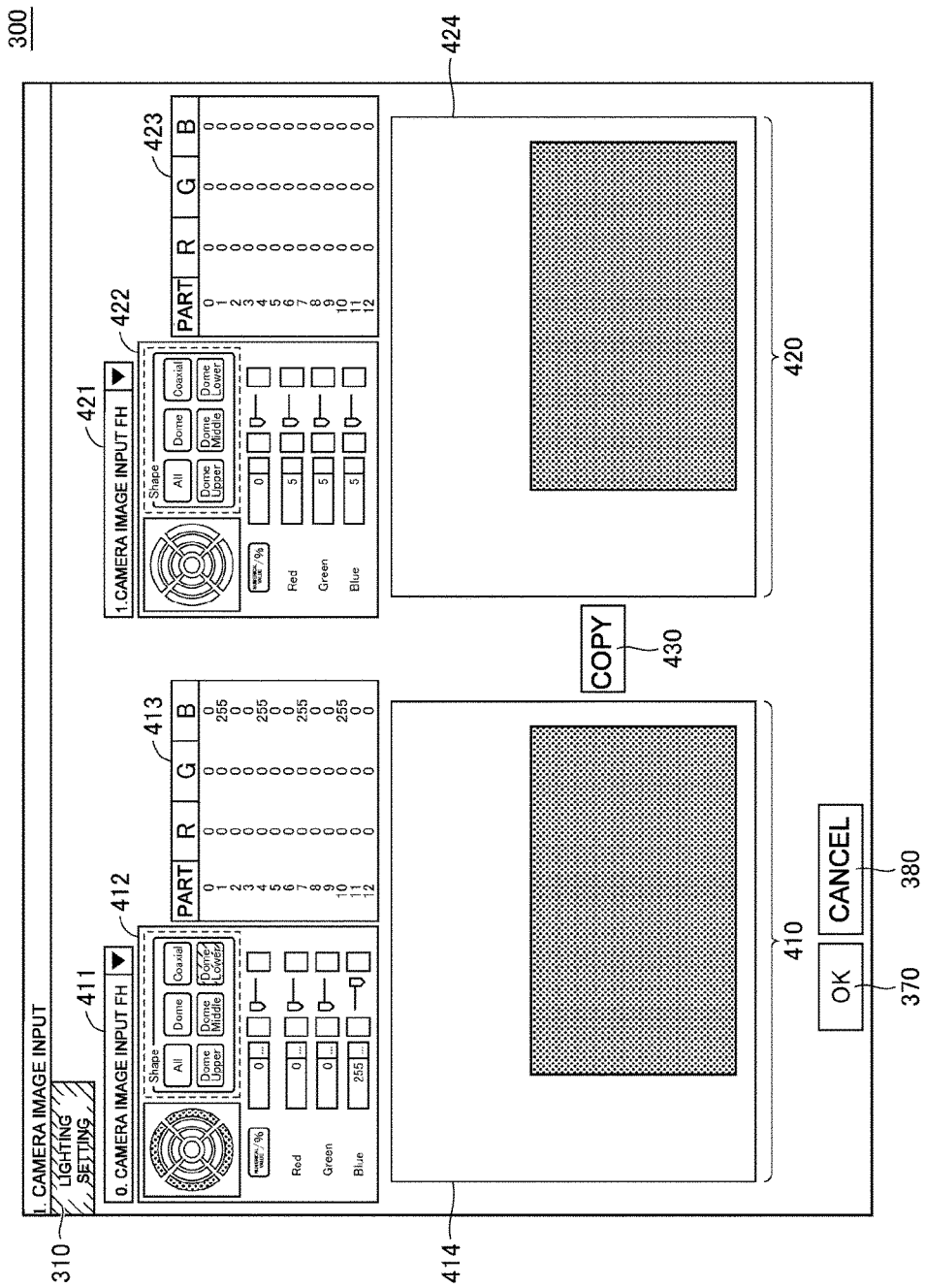
FIG. 9 is a view illustrating a screen in an initial stage when referring to different lighting setting.
Figure 10:
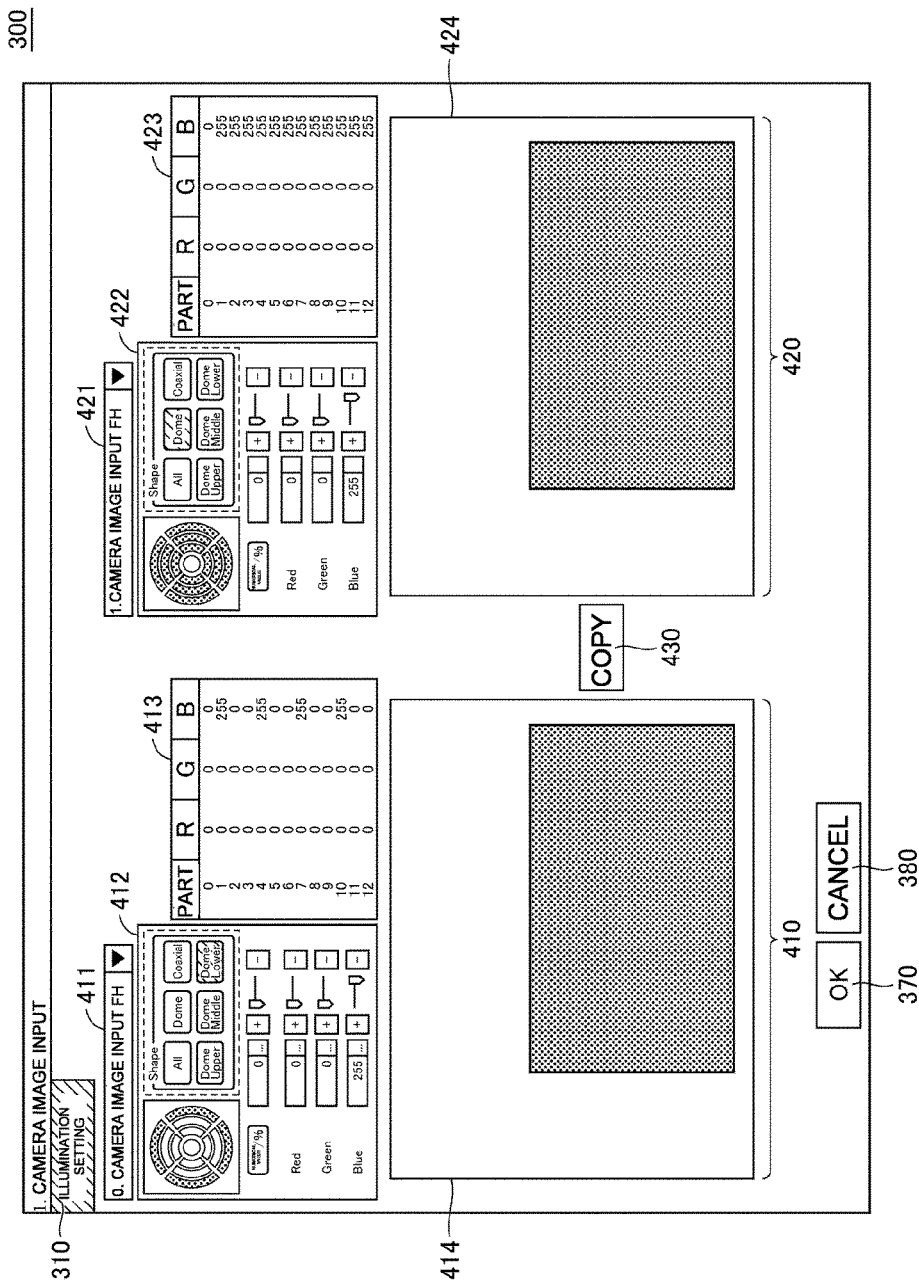
FIG. 10 is a view illustrating a screen after referring to the different lighting setting.

A user interface for referring to lighting setting will be described with reference to FIGS. 9 and 10. FIG. 9 is a view illustrating a screen in an initial stage when referring to different lighting setting. FIG. 10 is a view illustrating a screen after referring to the different lighting setting.

The image processing apparatus 100 can store multiple illumination patterns and can change the illumination pattern in accordance with the type of the workpiece W or the timing. For example, the image processing apparatus 100 can execute image processing using multiple pieces of image data generated from a captured image changed in illumination color. The image processing apparatus 100 stores information related to the timing of selecting an illumination pattern such that the information corresponds to the content of the lighting setting for realizing the illumination pattern. In the present embodiment, one camera 8 and one illumination device 4 are connected to the image processing apparatus 100. However, multiple cameras 8 and multiple illumination devices 4 may be connected thereto. For example, the illumination device 4 may be installed for each camera 8, and the image processing apparatus 100 may perform the lighting setting in accordance with the position at which the illumination device 4 is installed.

When the reference button 360 illustrated in FIG. 5 is pressed down, the screen is switched to a screen for referring to different lighting setting as illustrated in FIG. 9. In order to refer to different lighting setting, the user interface 300 includes the OK button 370, the cancel button 380, a reference region 410, a setting region 420, and a copy button 430.

The content of the lighting setting for a referent is displayed in the reference region 410. The reference region 410 includes a referent selecting tab 411 for selecting a referent, a region 412 in which the content of lighting setting for realizing the illumination pattern of the referent is graphically displayed, a region 413 in which the control content for realizing the illumination pattern of the referent is displayed, and a region 414 in which image data is displayed when an image is captured in the illumination pattern of the referent.

A referent can be selected by operating the referent selecting tab 411. Information of the selected referent is displayed in the region 412, the region 413, and the region 414.

The same types of buttons or icons as the buttons or icons included in the receiving region 320 illustrated in FIG. 5 are displayed in the region 412. In the region 412, the selected buttons are displayed in a form different from the forms of buttons which has not been selected such that the buttons selected to realize the illumination pattern of the referent can be identified.

In the region 413, the light emitting intensity of the red light sources, the light emitting intensity of the green light sources, and the light emitting intensity of the blue light sources are displayed for each of the multiple regions provided in the illumination device 4. The field for the part in the region 413 indicates corresponding region in the multiple regions. For example, in the parts 0 to 12, "0" indicates the central region 41, "1" indicates the front region lower portion 42L, "2" indicates the front region middle portion 42M, "3" indicates the front region upper portion 42U, "4" indicates the right region lower portion 43L, "7" indicates the rear region lower portion 44L, and "10" indicates the left region lower portion 45L, respectively. In the field for "R" in the region 413, the light emitting intensity of the red light sources in each region is displayed. In the field for "G", the light emitting intensity of the green light sources in each region is displayed. In the field for "B", the light emitting intensity of the blue light sources in each region.

When the copy button 430 is pressed down in a state in which a referent is selected, the content of the lighting setting for a referent is copied into the setting region 420.

The setting region 420 includes a setting destination selecting tab 421 for selecting a setting destination, a region 422 for receiving the lighting setting for a setting destination, a region 423 in which the control content for realizing the setting content received in the receiving region 422 is displayed, and a region 424 in which image data is displayed when an image is captured in accordance with the setting content received in the receiving region 422. The image data displayed in the region 424 is updated in real time. Since the region 422 is the same as the receiving region 320 illustrated in FIG. 5 and the region 423 is the same as the region 413, description thereof will be omitted.

A user can change the lighting setting for a reference source by operating the buttons or the icons included in the region 422. In addition, when a user operates the buttons or the icons included in the region 422 and changes the content of lighting setting, the processor 110 of the image processing apparatus 100 instructs the illumination device 4 to be turned on in accordance with the changed setting content. Since the image data displayed in the region 424 is updated in real time, image data when an image is captured in accordance with the setting content which is changed by a user operating the buttons or the icons included in the region 422 is displayed in the region 424.

For example, as illustrated in FIG. 10, lighting setting can be performed while comparing the lighting setting with the setting content of the reference source. In addition, a user can utilize the lighting setting which has already been stored.

[G. Functional Configuration of Control Program 150]

Figure 11:
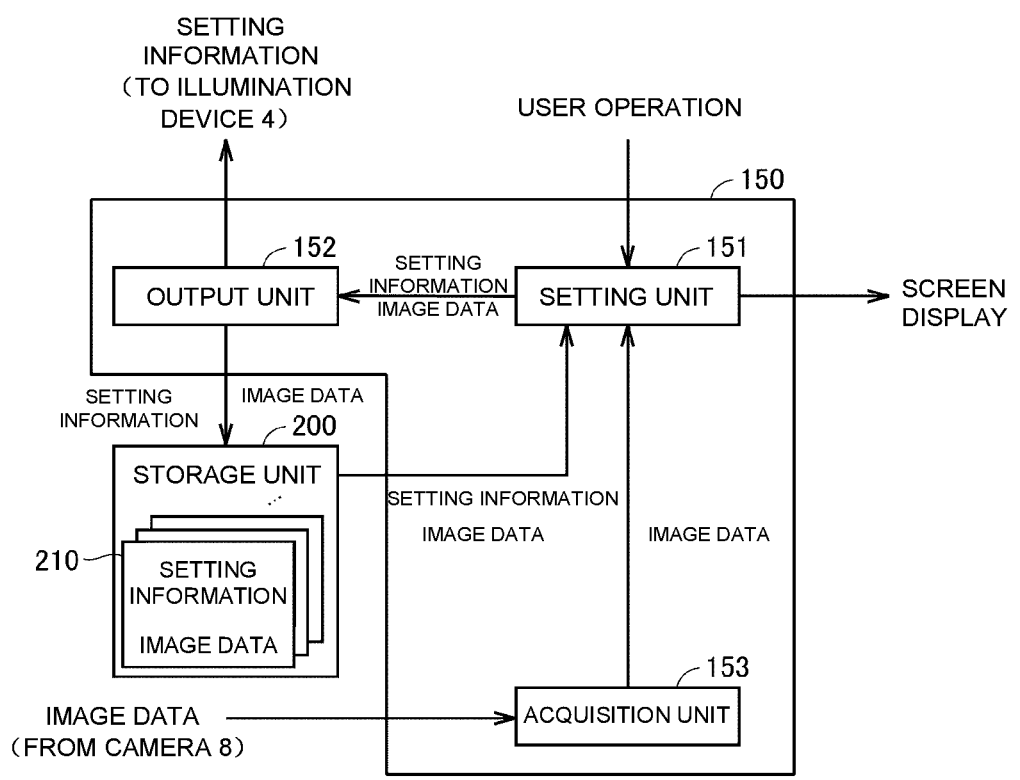
FIG. 11 is a schematic view illustrating a configuration of a control program.

Next, a functional configuration of the control program 150 for realizing the user interface which has been described with reference to FIGS. 6 to 10 will be described. FIG. 11 is a schematic view illustrating a configuration of the control program 150.

As a basic functional configuration, the control program 150 includes a setting unit 151, an output unit 152, and an acquisition unit 153.

The setting unit 151 provides the user interface 300 for performing lighting setting. That is, the setting unit 151 causes the display unit 101 to display the user interface 300 as illustrated in FIGS. 6 to 10 and generates setting information indicating setting of the content of image processing performed in accordance with a user operation. The setting unit 151 sends the generated setting information to the output unit 152.

The output unit 152 outputs the sent setting information to the illumination device 4. The illumination device 4 turns on and turns off the light sources based on the output setting information.

The acquisition unit 153 acquires image data generated by the camera 8. The acquisition unit 153 sends the image data to the setting unit 151. The setting unit 151 causes the sent image data to be displayed in a screen.

When the setting unit 151 is instructed to retain setting information in accordance with a user operation, the setting unit 151 transmits the setting information and the image data to the output unit 152 and instructs the output unit 152 to retain the setting information and the image data.

The output unit 152 causes a storage unit 200 to correspondingly store the sent setting information and image data in accordance with an instruction of the setting unit 151. The storage unit 200 stores the sent setting information and image data as processing information 210 for each processing content for image processing.

In addition, when the setting unit 151 is instructed to refer to the lighting setting in accordance with a user operation, the setting unit 151 acquires the setting information and the image data from the storage unit 200 and causes the information to be displayed in a screen.

[H. Data Structure of Processing Information]

Figure 12:
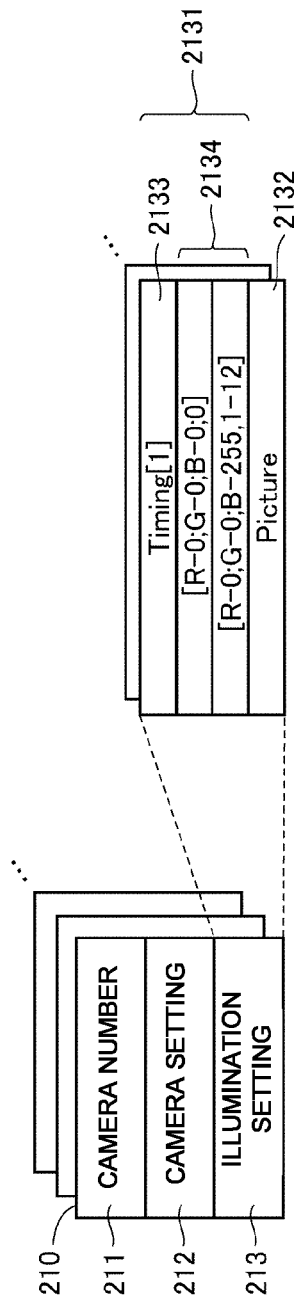
FIG. 12 is a schematic view illustrating an example of a data structure of processing information.

A data structure of the processing information 210 will be described with reference to FIG. 12. FIG. 12 is a schematic view illustrating an example of the data structure of processing information. As illustrated in FIG. 11, the processing information 210 is stored in the storage unit 200. The processing information includes a camera number field 211, a camera setting field 212, and an illumination setting field 213.

The camera number field 211 stores information for identifying the camera 8. The information for identifying the camera 8 may be information indicating terminal information of the camera 8. In addition, the information for identifying the camera 8 may be information indicating a connection port for connection with the camera 8 provided in the image processing apparatus 100.

The camera setting field 212 stores information indicating setting of the camera 8. For example, a shutter speed of the camera 8, an open value, timing of acquiring image data, and the like are stored.

The illumination setting field 213 stores information indicating the lighting setting with respect to the illumination device 4. The illumination setting field 213 includes a setting information field 2131 and an image data field 2132. The setting information field 2131 stores the setting information. The image data field 2132 stores the image data.

The setting information field 2131 includes a timing field 2133 and a lighting content field 2134.

The timing field 2133 stores information for identifying the timing of switching a lighting content to the lighting content stored in the lighting content field 2134.

The lighting content field 2134 stores information for identifying the illumination pattern. Specifically, information in which light emitting intensity of the red light sources R, the green light sources G, and the blue light sources B and the regions to be turned on with the light emitting intensity correspond to each other are stored.

[I. Setting Processing]

Figure 13:
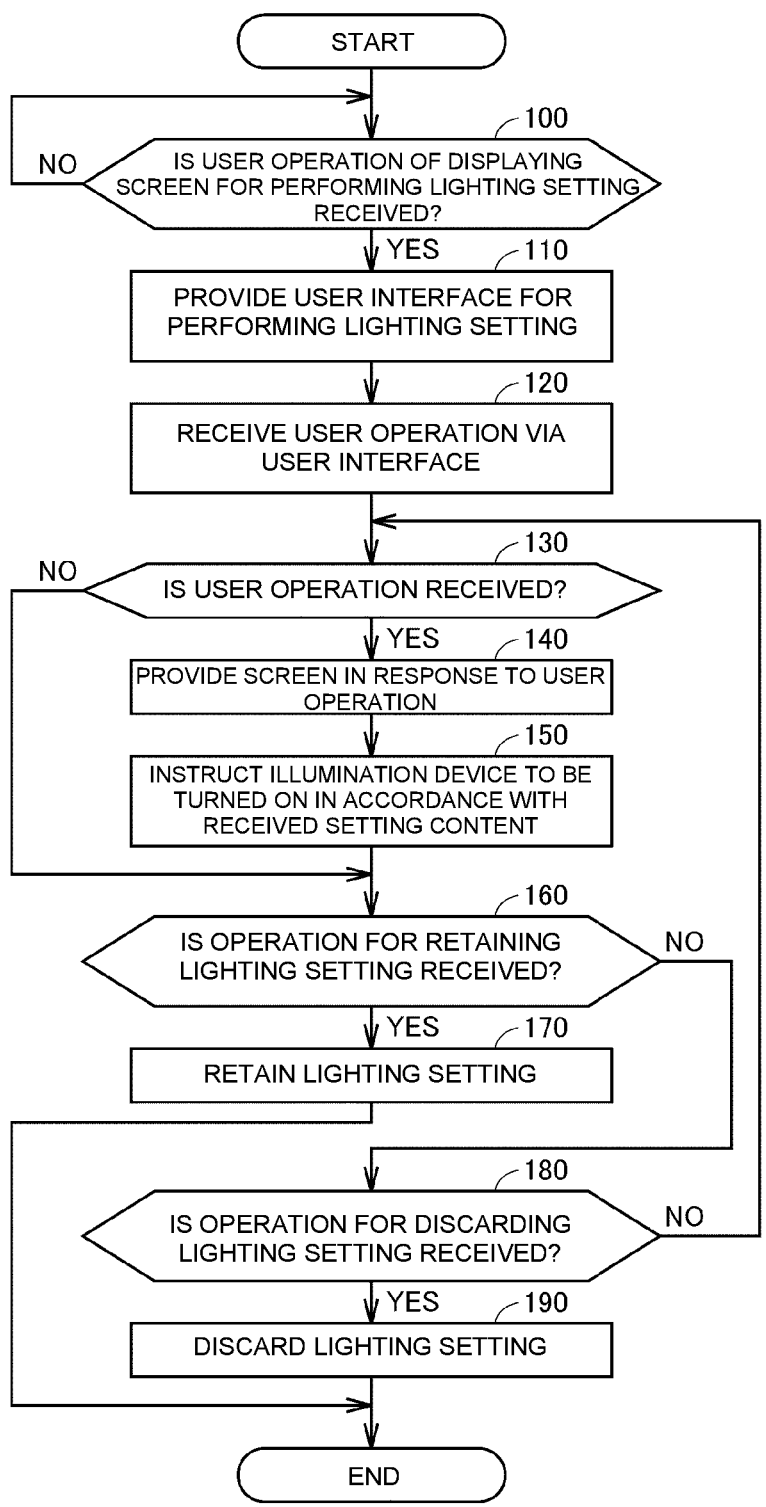
FIG. 13 is a flow chart showing processing of lighting setting.

A control structure of the image processing system 1 will be described with reference to FIG. 13. FIG. 13 is a flow chart showing setting processing which is executed by the image processing apparatus 100 to perform lighting setting.

For example, the processing illustrated in FIG. 13 is realized by the processor 110 (refer to FIG. 2) of the image processing apparatus 100 executing a program. As another aspect, a part or the entirety of the processing may be executed by different hardware.

In Step S100, the processor 110 determines whether or not a user operation of displaying a screen for performing lighting setting is received. When the processor 110 determines that a user operation of displaying a screen for performing lighting setting is received (YES in Step S100), the processor 110 switches control to Step S110. In a case of negative determination (NO in Step S100), the processor 110 executes the processing of Step S100 again.

In Step S110, the processor 110 provides the user interface 300 (refer to FIG. 5) for performing lighting setting, as the setting unit 151 (refer to FIG. 11) described above. For example, the user interface 300 is displayed in the display unit 101 (refer to FIG. 1) of the image processing apparatus 100.

In Step S120, the processor 110 receives a user operation via the user interface 300, as the setting unit 151 (refer to FIG. 1) described above.

In Step S130, the processor 110 determines whether or not a user operation is received. As an example, when a user operates the touch panel 102 and operations of various buttons or various icons in the receiving region 320 are detected, the processor 110 determines that a user operation is received. When the processor 110 determines that a user operation is received (YES in Step S130), the processor 110 switches control to Step S140. In a case of negative determination (NO in Step S130), the processor 110 switches control to Step S160.

In Step S140, the processor 110 provides a screen in response to a user operation, as the setting unit 151 (refer to FIG. 11) described above. For example, the setting content received in response to a user operation is displayed in the setting content displaying region 330.

In Step S150, the processor 110 instructs the illumination device 4 to be turned on in accordance with the setting content received in response to a user operation, as the output unit 152 described above.

In Step S160, the processor 110 determines whether or not an operation for retaining lighting setting is received. As an example, when it is detected that the OK button 370 of the user interface 300 is pressed down, the processor 110 determines that an operation for retaining lighting setting is received. When the processor 110 determines that an operation for retaining lighting setting is received (YES in Step S160), the processor 110 switches control to Step S170. In a case of negative determination (NO in Step S160), the processor 110 switches control to Step S180.

In Step S170, the processor 110 retains the lighting setting, which has been set in the user interface 300, in the storage unit 200 that is a part of the function of the RAM 112, thereby ending the processing.

In Step S180, the processor 110 determines whether or not an operation for discarding lighting setting is received. As an example, when it is detected that the cancel button 380 of the user interface 300 is pressed down, the processor 110 determines that an operation for discarding lighting setting is received. When the processor 110 determines that an operation for discarding lighting setting is received (YES in Step S180), the processor 110 switches control to Step S190. In a case of negative determination (NO in Step S180), the processor 110 causes control to return to Step S130.

In Step S190, the processor 110 discards the lighting setting, thereby ending the processing.

MODIFICATION EXAMPLE

[J. Light Emitting Intensity Receiving Region]

In the present embodiment, light emitting intensity of various light sources is adjusted by operating the light emitting intensity adjustment bar 352. However, the relative light emitting intensity may be changed without changing the light emitting intensity for all of the light emitting units. FIGS. 14 to 16 are views each illustrating a modification example of the light emitting intensity receiving region 350.

For example, as illustrated in FIG. 14, a brightness fixing button 354 may be provided. The relative light emitting intensity may be changed by pressing down the brightness fixing button 354, without changing the light emitting intensity for all of the light emitting units. For example, when the brightness fixing button 354 is pressed down, the light emitting intensity adjustment bar 352 is indicated in percentage. The relative light emitting intensity of the red light sources R, the green light sources G, and the blue light sources B can be adjusted by operating the light emitting intensity adjustment bar 352. In this manner, since the relative light emitting intensity can be adjusted while the light emitting intensity for all of the light emitting units remains fixed, a user can adjust the color of light without regardless of the light emitting intensity for all of the light emitting units. In addition, as illustrated in FIG. 15, a contrast bar 356 may be provided. The intensity of light can be adjusted by operating the contrast bar 356.

In addition, a configuration of selecting a color regulated based on light emitting intensity of various light sources may be employed. For example, as illustrated in FIG. 15, a hue bar 355 may be provided. The color of light can be regulated by operating the hue bar 355. In addition, as illustrated in FIG. 16, a button 357 indicating a color may be provided. The color of light may be selected by preparing buttons indicating typical colors to be used in image processing in advance and selecting the button corresponding to the color of desired irradiation light.

[K. Lighting Region Receiving Region]

The lighting region receiving region 340 of the present embodiment includes the lighting shape receiving region 341 and the lighting direction receiving region 342. However, a user interface for selecting a region is not limited thereto. For example, a user interface in which regions are selected one by one may be employed.

[L. Setting Content Displaying Region]

Figure 17:
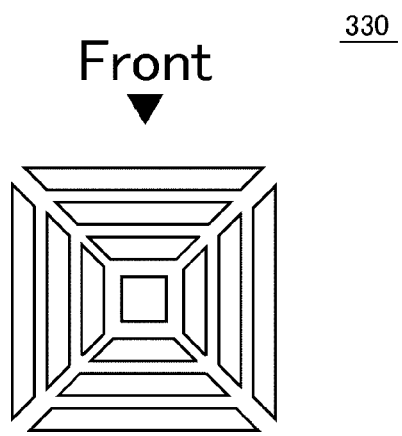
FIG. 17 is a view illustrating a modification example of a setting content displaying region.

In the present embodiment, in the setting content displaying region 330, regions are displayed in the same shape as the shape of the region set with respect to the light sources of the illumination device 4. However, there is no need for the shape of the region which is set with respect to the light source of the illumination device 4 and is displayed in the setting content displaying region 330 to completely coincide with the shape of the region which is actually set with respect to the light source of the illumination device 4. The multiple regions displayed in the setting content displaying region 330 need only correspond to the multiple regions which are actually set with respect to the light source of the illumination device 4. For example, as illustrated in FIG. 17, the region set with respect to the light source of the illumination device 4 may be shown in a quadrangular shape.

[M. Region Set with Respect to Light Source of Illumination Device]

Figure 18:
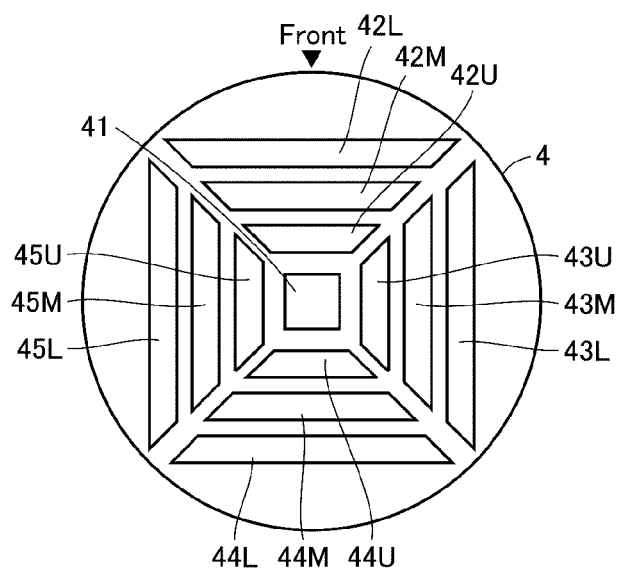
FIG. 18 is a view illustrating a modification example of the illumination device.

In the present embodiment, the shape of the region set with respect to the light source of the illumination device 4 has a circular shape in its entirety. The region may be arbitrarily set with respect to the light sources of the illumination device 4, and the shape thereof is not limited. For example, as illustrated in FIG. 18, the shape may be a quadrangular shape in its entirety.

In addition, an "annular shape" need only be a shape having a cavity at the center and having pieces arranged in line. The shape is not limited to a toric shape as in the present embodiment. For example, an "annular shape" may be a quadrangular shape which is hollowed at the center in a quadrangular manner, for example, as the upper region configured to include the front region upper portion 42U, the right region upper portion 43U, the rear region upper portion 44U, and the left region upper portion 45U in FIG. 18.

An "arc-shaped" need only be a shape realized by dividing one annular body into multiple pieces. The shape is not limited to the bow shape as in the present embodiment. For example, an "arc-shaped" may be a trapezoidal shape, for example, as the left region upper portion 45U in FIG. 18.

In addition, in the present embodiment, the central region 41 is a circular region. However, the central region 41 need only be a region positioned substantially at the center of a surface on which the light sources are installed, and the shape is not limited to a circular shape. For example, as illustrated in FIG. 18, the central region 41 may have a quadrangular shape. In addition, in FIGS. 2 and 18, the shapes of the central region and the annular regions are shapes related to each other. However, the central region may have a quadrangular shape, whereas the annular regions have ring shapes. In addition, the central region may have a circular shape, whereas the annular regions have framed shapes.

Advantages

As described above, in the present embodiment, one or multiple regions can be selected, and light emitting intensity of multiple types of the light sources having dominant wavelengths different from each other included in the selected region can be set. As a result, lighting setting can be easily performed compared to when the regions are set one by one.

In the present embodiment, one or multiple regions can be selected by selecting one region group from each of the lighting shape receiving region 341 and the lighting direction receiving region 342. Therefore, when the multiple regions are selected, the selection can be completed by performing operations twice only. Consequently, the region can be easily selected.

In the present embodiment, the user interface 300 provides the brightness adjustment bar 351 which can adjust the light emitting intensity for all of the light emitting units without changing the relative light emitting intensity. Therefore, the light emitting intensity for all of the light emitting units can be adjusted after the color of irradiation light from the illumination device 4 is determined. Accordingly, although the color of light is adjusted, it is possible to resolve a disadvantage of a color change caused due to adjusted light emitting intensity.

In the present embodiment, since a selected region is displayed in a form different from the forms of other regions, a user can easily check for which region is being subjected to setting.

In the present embodiment, when the light emitting intensity of the light sources included in the selected region is set, the selected region is displayed in a color of light regulated based on the set light emitting intensity. Therefore, when light emitting intensity is adjusted, a user can easily recognize which color is regulated based on the adjusted light emitting intensity.

In the present embodiment, since image data obtained when an image is captured in the selected illumination pattern is displayed, a user can perform lighting setting with respect to the illumination device 4 while checking the actual image data.

In the present embodiment, since it is possible to referring to different illumination patterns, a user can reduce a setting workload compared to when setting is performed from the beginning.

In the present embodiment, an illumination pattern can be selected while comparing the illumination pattern with the image data which can be obtained when an image is captured in the referred illumination pattern. Therefore, lighting setting can be performed based on the referred illumination pattern.

The embodiment disclosed herein ought to be considered as an example which is not restrictive in every respect. It is intended that the scope of the disclosure is defined not by the description above but by the aspects of the disclosure and includes the meaning equivalent to the aspects of the disclosure and all the changes within the scope. In addition, it is intended that the disclosure described in the embodiment and each of the modification examples is realized alone or in combination as much as possible.

What is claimed is:

1. A setting support apparatus performing lighting setting with respect to an illumination device which includes multiple sets of multiple types of light emitting units having dominant wavelengths different from each other, the setting support apparatus comprising:
  a display unit and a touch panel mounted on a display surface of the display unit, configured to display a user interface and receive a user operation to perform the lighting setting in accordance with the user operation, wherein the setting support apparatus is configured to output the lighting setting performed via the user interface to the illumination device, wherein the user interface comprises a setting content displaying region configured to display multiple regions set with respect to a lighting region of each set of the multiple light emitting units, a lighting region receiving region configured to receive selection of one or multiple regions from the multiple regions, a light emitting intensity receiving region configured to receive designation of light emitting intensity for each type of the light emitting units, and a full display region configured to display an image of a target captured by an image capturing unit, wherein the image capturing unit is configured to capture the image of the target through an opening portion of an upper portion of the illumination device, wherein the setting support apparatus sets the designated light emitting intensity for each type with respect to the light emitting units included in the selected one or multiple regions.

2. The setting support apparatus according to claim 1, wherein setting content displaying region displays the selected one or multiple regions in a form different from the forms of other regions.

3. The setting support apparatus according to claim 2, wherein the setting content displaying region displays the selected one or multiple regions in a color regulated based on the designated light emitting intensity for each type.

4. The setting support apparatus according to claim 1, wherein the multiple regions include one or multiple annular regions, wherein each of the one or multiple annular regions has multiple arc-shaped regions, and wherein the lighting region receiving region comprises a lighting shape receiving region configured to receive selection of one or multiple arc-shaped regions from the multiple arc-shaped regions.

5. The setting support apparatus according to claim 4, wherein the multiple regions include the multiple annular regions having diameters different from each other, and wherein the lighting region receiving region comprises a lighting direction receiving region configured to receive selection of one or multiple annular regions from the multiple annular regions having diameters different from each other.

6. The setting support apparatus according to claim 1, wherein the light emitting intensity receiving region comprises a receiving brightness adjustment bar configured to receive designation of light emitting intensity for all of the light emitting units in a state in which relative light emitting intensity for each type of the light emitting units with respect to the light emitting intensity for all of the light emitting units included in the selected one or multiple regions is uniformly maintained.

7. The setting support apparatus according to claim 1, wherein the light emitting intensity receiving region comprises a light emitting intensity adjustment bar configured to receive designation of relative light emitting intensity for each type of the light emitting units with respect to the light emitting intensity for all of the light emitting units in a state in which light emitting intensity for all of the light emitting units included in the selected one or multiple regions is uniformly maintained.

8. The setting support apparatus according to claim 1, wherein the setting support apparatus acquires image data which is generated from an image of an irradiation region of the illumination device captured by an image capturing device, wherein the user interface displays the image data acquired by the acquisition means.

9. The setting support apparatus according to claim 1, wherein the setting support apparatus is configured to store the lighting setting set via the user interface, wherein the user interface comprises a reference region configured to output information related to the lighting setting stored by the storage means and receive a change in the output lighting setting.

10. The setting support apparatus according to claim 9, wherein the setting support apparatus is configured to acquire image data which is generated from an image of an irradiation region of the illumination device captured by an image capturing device, wherein the storage unit correspondingly stores the set lighting setting and the image data generated from an image captured when the illumination device irradiates the irradiation region under the lighting setting, and wherein the user interface further comprises a receiving region configured to display the output lighting setting and the image data corresponding to the lighting setting and displaying lighting setting of which a change is received and image data generated from an image captured when the illumination device irradiates the irradiation region under the lighting setting.

11. A non-transitory computer-readable recording medium recording a setting support program for performing lighting setting with respect to an illumination device which includes multiple sets of multiple types of light emitting units having dominant wavelengths different from each other, the setting support program comprising:

a step of receiving selection of one or multiple regions from multiple regions set with respect to a lighting region of each set of the multiple light emitting units;

a step of receiving designation of light emitting intensity for each type of the light emitting units;

a step of setting the designated light emitting intensity for each type with respect to the light emitting units included in the selected one or multiple regions;

a step of outputting lighting setting including the set light emitting intensity to the illumination device, and a step of displaying an image of a target captured by an image capturing unit, wherein the image capturing unit is configured to capture the image of the target through an opening portion of an upper portion of the illumination device.

12. The setting support apparatus according to claim 2, wherein the multiple regions include one or multiple annular regions, wherein each of the one or multiple annular regions has multiple arc-shaped regions, and wherein lighting region receiving region comprises a lighting shape receiving region configured to receive selection of one or multiple arc-shaped regions from the multiple arc-shaped regions.

13. The setting support apparatus according to claim 3, wherein the multiple regions include one or multiple annular regions, wherein each of the one or multiple annular regions has multiple arc-shaped regions, and wherein the lighting region receiving region comprises a lighting shape receiving region configured to receive selection of one or multiple arc-shaped regions from the multiple arc-shaped regions.

14. The setting support apparatus according to claim 2, wherein the light emitting intensity receiving region comprises a receiving brightness adjustment bar configured to receive designation of light emitting intensity for all of the light emitting units in a state in which relative light emitting intensity for each type of the light emitting units with respect to the light emitting intensity for all of the light emitting units included in the selected one or multiple regions is uniformly maintained.

15. The setting support apparatus according to claim 3, wherein the light emitting intensity receiving region comprises a receiving brightness adjustment bar configured to receive designation of light emitting intensity for all of the light emitting units in a state in which relative light emitting intensity for each type of the light emitting units with respect to the light emitting intensity for all of the light emitting units included in the selected one or multiple regions is uniformly maintained.

16. The setting support apparatus according to claim 4, wherein the light emitting intensity receiving region comprises a receiving brightness adjustment bar configured to receive designation of light emitting intensity for all of the light emitting units in a state in which relative light emitting intensity for each type of the light emitting units with respect to the light emitting intensity for all of the light emitting units included in the selected one or multiple regions is uniformly maintained.

17. The setting support apparatus according to claim 5, wherein the light emitting intensity receiving region comprises a receiving brightness adjustment bar configured to receive designation of light emitting intensity for all of the light emitting units in a state in which relative light emitting intensity for each type of the light emitting units with respect to the light emitting intensity for all of the light emitting units included in the selected one or multiple regions is uniformly maintained.

18. The setting support apparatus according to claim 2, wherein the light emitting intensity receiving region comprises a light emitting intensity adjustment bar configured to receive designation of relative light emitting intensity for each type of the light emitting units with respect to the light emitting intensity for all of the light emitting units in a state in which light emitting intensity for all of the light emitting units included in the selected one or multiple regions is uniformly maintained.

19. The setting support apparatus according to claim 3, wherein the light emitting intensity receiving region comprises a light emitting intensity adjustment bar configured to receive designation of relative light emitting intensity for each type of the light emitting units with respect to the light emitting intensity for all of the light emitting units in a state in which light emitting intensity for all of the light emitting units included in the selected one or multiple regions is uniformly maintained.

\* \* \* \* \*